(12) United States Patent
Christenson (10) Patent No.: US 6,894,836 B2
(45) Date of Patent: May 17, 2005

(54) DIFFRACTION GRATING, METHOD OF MAKING AND METHOD OF USING

(75) Inventor: John C. Christenson, Kokomo, IN (US)

(73) Assignee: Delphi Technologies, Inc., Troy, MI (US)

(*) Notice: Subject to any disclaimer, the term of this patent is extended or adjusted under 35 U.S.C. 154(b) by 211 days.

(21) Appl. No.: 09/940,080

(22) Filed: Aug. 28, 2001

(65) Prior Publication Data

US 2003/0043444 A1 Mar. 6, 2003

(51) Int. Cl.⁷ ................................................. G02B 5/18
(52) U.S. Cl. ........................ 359/563; 359/569; 359/572; 359/573
(58) Field of Search ............................... 359/227, 230, 359/231, 558, 563, 567, 572, 573, 575, 900, 232, 233, 569, 566; 385/16, 18, 37

(56) References Cited

U.S. PATENT DOCUMENTS

| | | | |
|---|---|---|---|
| 4,631,416 A | * 12/1986 | Trutna, Jr. | 250/548 |
| 4,710,732 A | 12/1987 | Hornbeck | 332/7.51 |
| 5,096,282 A | 3/1992 | Margerum et al. | |
| 5,677,783 A | 10/1997 | Bloom et al. | 359/224 |
| 5,835,256 A | 11/1998 | Huibers | 359/291 |
| 5,841,579 A | 11/1998 | Bloom et al. | 359/572 |
| 5,949,570 A | 9/1999 | Shiono et al. | 359/291 |
| 5,953,161 A | 9/1999 | Troxell et al. | 359/618 |
| 6,356,854 B1 | 3/2002 | Schubert et al. | |

OTHER PUBLICATIONS

*Structure for Realizing Unequal Capacitive Gaps While Holding Trench Widths Constant*, Research Disclosure No. 439065 (Nov. 2000), p. 1942.

* cited by examiner

Primary Examiner—James Phan
(74) Attorney, Agent, or Firm—Stefan V. Chmielewski (57) ABSTRACT

A diffraction grating device operable as a reflection or transmission grating, and a method of manufacturing and using any number of such grating devices so that each device is individually electrically addressable to diffract radiation of different wavelengths. The grating device comprises first and second sets of interdigitated elements so that each element of the first set defines an element pair with an immediately adjacent element of the second set, a first gap is defined between the elements of each element pair, and a second gap is defined between each adjacent pair of element pairs. The elements of an element pair are selectively movable toward and away from each other. As such, the widths of the gaps can be selectively sized to diffract radiation of a desired wavelength.

53 Claims, 5 Drawing Sheets

DIFFRACTION GRATING, METHOD OF MAKING AND METHOD OF USING

CROSS REFERENCE TO RELATED APPLICATIONS

Not applicable.

STATEMENT REGARDING FEDERALLY-SPONSORED RESEARCH

Not applicable.

BACKGROUND OF THE INVENTION (1) Field of the Invention

The present invention generally relates to methods and devices for modulating radiation, such as when a light beam is modulated to produce a color image. More particularly, this invention relates to a diffraction grating device with interdigitized elements that can be individually electrically addressable to diffract radiation of different wavelengths, and can be used in a variety of optical devices, such as a compact, reconfigurable full-color image source.

(2) Description of the Related Art

Devices with individual electrically-addressable elements have been considered for use in full-color, reconfigurable image sources, such as head-up displays (HUD's) in automobiles. Such devices generally provide a full color image source by modulating a light beam with the use of numerous pixels, each defined by an individual or set of modulating elements. For example, color images have been produced by reflecting light using a separate moveable mirror for each pixel, such as in U.S. Pat. No. 4,710,732 to Hornbeck. Individual electrically-addressable diffraction grating devices have also been considered. In U.S. Pat. No. 5,841,579 to Bloom et al., a light beam is modulated by periodically deforming a substantially flat reflective surface. The reflective surface has selectively deformable portions that provide a diffraction grating as a result of the deformable portions being biased out of the plane of the reflective surface, such that light modulation is achieved by diffraction.

Bloom et al. further disclose the use of multiple gratings per pixel, in which each grating within a pixel is configured to produce a different light color to effect a full color array. A disadvantage of pixels formed of multiple gratings is that they are necessarily larger than pixels containing only one grating. Another disadvantage is that any grating not being used to produce a specific color diffraction will be a dark space in the pixel. Additionally, a difficulty arises because each grating in the pixel must be addressable so that the desired color for that pixel can be attained. While addressing a grating can be easily accomplished using top side metal runners, at least two runner per grating is needed, each of which creates an undesirable dark space on the pixel. As the number of gratings per pixel is increased to enhance the full color effect, a greater number of runners is likewise required, such that an array of such pixels becomes more complex and difficult to address, and pixel density is decreased resulting in a lower resolution for the pixel array.

In view of the above, one can appreciate the need and difficulty of achieving a diffraction grating device capable of providing a compact, reconfigurable full-color image source that can be readily manufactured. Such a device would preferably overcome the shortcomings of the prior art by minimizing dark spaces, simplifying addressing and maximizing pixel density.

SUMMARY OF THE INVENTION

The present invention is a diffraction grating device and a method of manufacturing and using any number of such grating devices so that each device is individually electrically addressable to diffract radiation of different wavelengths, while also being configured to minimize device size, have minimal inactive (dark) areas, and have an uncomplicated addressing scheme. An example of an application for diffraction grating devices of this invention is a compact, reconfigurable full-color image source, in which each pixel is defined by a grating device. Such an image source can have a high pixel density as a result of reduced pixel size, minimal dark space per pixel, and a simplified addressing scheme. In addition to size and simplicity, diffraction grating devices of this invention also satisfy the current need for reconfigurable optical devices because of their ease of manufacture and utility.

The diffraction grating device of this invention generally comprises first and second sets of elements. The first set of elements extends toward and is interdigitated with the second set of elements so that each element of the first set of elements defines an element pair with an immediately adjacent element of the second set of elements. A first gap is defined between the elements of each element pair and a second gap is defined between each adjacent pair of element pairs. The diffraction grating device further includes means for moving the elements of an element pair toward and away from each other, with the result that the first and second gaps can be increased and decreased. According to the invention, the grating device formed by the interdigitated elements can be operated as a reflection grating or a transmission grating. As a reflection grating, radiation projected onto the interdigitated elements is reflected off the top surface of each element, such that the elements serve as multiple sources for diffraction and the gaps therebetween serve as rulings for the device. As a transmission grating, radiation is projected through the first and second gaps between the elements of the element pairs, such that the gaps serve as multiple sources for diffraction and the elements therebetween serve as rulings for the device. According to the invention, the widths of the first and second gaps can be selectively sized so that radiation is diffracted by the grating device to produce a beam of radiation of a desired wavelength.

In view of the above, the gaps between the interdigitated elements of the invention are not fixed as in prior art diffraction gratings. Instead, the interdigitated elements are movable in-plane toward and away from each other, so that particular wavelengths are diffracted by controlling the gaps within and between the element pairs. The elements are individually electrically addressable to diffract radiation of any desired wavelength by precisely adjusting the gap widths, such as by capacitively charging the elements with a digital or analog signal. Any number of element pairs can be readily fabricated in a single device to achieve a small grating size with desirable dispersion and resolution levels. The interdigitated elements are configured so that each set of element pairs is capable of being electrically addressed in an uncomplicated manner. The result is a diffraction grating of minimal size, having minimal dark areas, and capable of precisely diffracting radiation of essentially any desired wavelength. When diffraction grating devices of this invention are used as pixels, an image source utilizing the devices is capable of having a high pixel density while retaining the ability to selectively diffract any chosen color, which are desirable characteristics of a full-color, reconfigurable image source such as a head-up display (HUD) for an automobile.

DESCRIPTION OF THE PREFERRED EMBODIMENT

The Figures represent various different embodiments and applications for a diffraction grating device in accordance with the present invention. In each case, the device can be adapted to operate as a reflection grating in which radiation is diffracted by reflection, or as a transmission grating in which radiation is diffracted by transmission through gaps. Any number of these devices can be used in various optical devices, including optical switches, chromatographs, and reconfigurable full-color image sources. In the latter, each grating device is an individually and electrically addressable pixel of the image source. The small grating size and simple addressing schemes made possible with this invention enable the individual pixels to be small with minimal dark spaces, thus enabling the image source to have a high pixel density and a high level of resolution. While the following discussion will focus on diffracting spectral light to produce visible light of desired colors, those skilled in the art will appreciate that monochromatic and polarized light could be diffracted, as well as radiation outside the visible spectrum (i.e., outside wavelengths of about 0.4 to about 0.7 micrometer).

Figure 1:
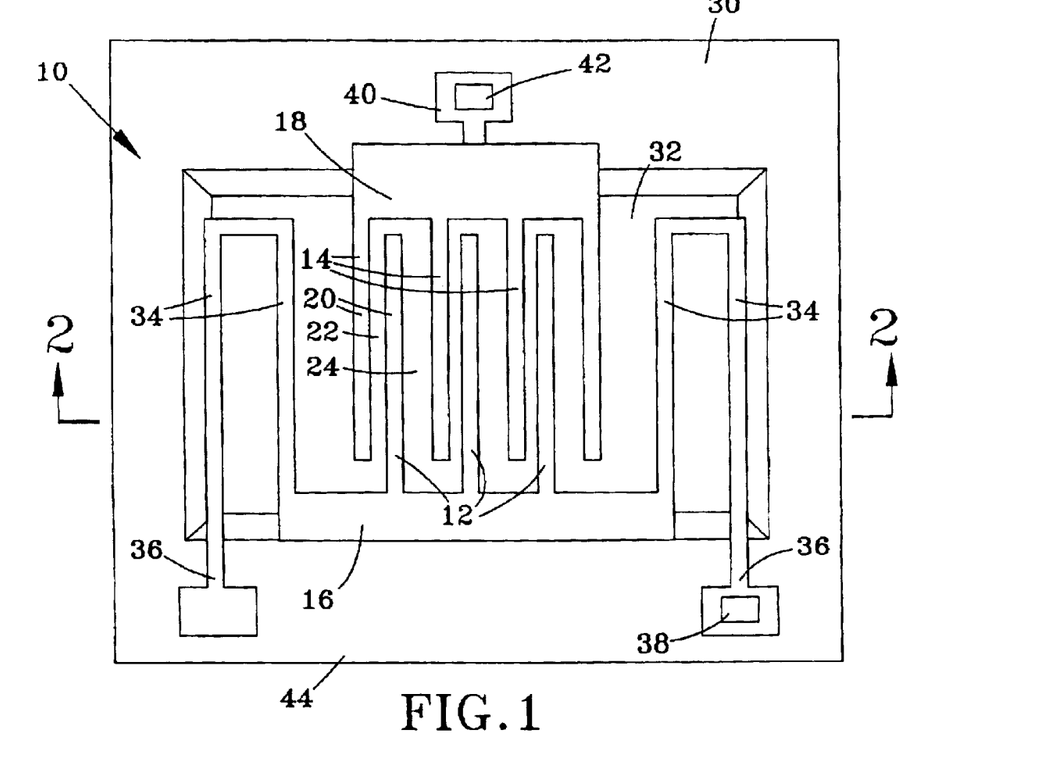
FIGS. 1 and 2 are plan and cross-sectional views, respectively, of a diffraction grating device in accordance with a first embodiment of this invention.
Figure 2:
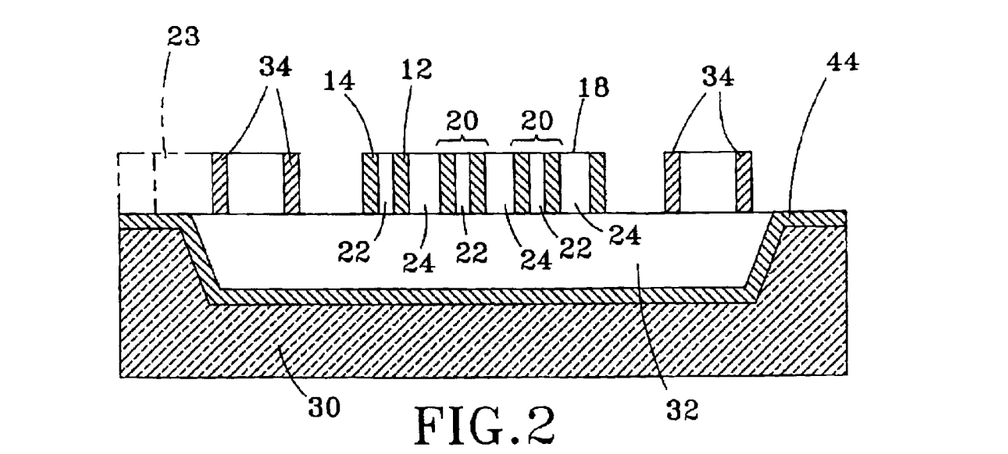

FIGS. 1 and 2 represent a diffraction grating device 10 in accordance with the invention. The device 10 is shown as comprising two sets of interdigitated fingers 12 and 14, each of which is cantilevered from a base 16 and 18, respectively, over a cavity 32 defined in a substrate 30. The base 18 of the fingers 14 is shown as being attached to the substrate 30 by an anchor 40. In contrast, the base 16 of the fingers 12 is suspended over the cavity 32 by a pair of springs 34, each of which is attached to the substrate 30 by an anchor 36. As such, the fingers 12 are movable in unison relative to the fingers 14. In describing the operation of the device 10, it will be convenient to view adjacent fingers 12 and 14 as being paired to define finger pairs 20 separated by a gap 22, while each adjacent set of finger pairs 20 is separated by a second gap 24. The widths of the gaps 22 and 24 can be altered by laterally moving the fingers 12 suspended by the springs 34 (therefore, termed "movable fingers") relative to the fingers 14 rigidly anchored to the substrate 30 (therefore, termed "fixed fingers").

The grating device 10 can be fabricated by etching a semiconductor material in accordance with known semiconductor fabrication processes, though those skilled in the art will appreciate that the device 10 could be fabricated by other methods and from other materials. Notable alternative processing methods include silicon-on-insulator (SOI) plus etch and release, and etching a film (e.g., polysilicon) on a sacrificial layer. If the device 10 is fabricated using semiconductor processing, the fingers 12 and 14 may be formed in a single semiconductor die or a die comprising a semiconductor layer on a suitable substrate. Preferred materials depend on whether the grating device 10 is to operate as a reflection or transmission grating. As a reflection grating, the fingers 12 and 14 can be formed of epitaxial silicon, though it is foreseeable that other materials could be used, such as single crystal silicon, polysilicon, SOI, silicon dioxide in its many forms (e.g., quartz, glass, thermally-grown oxide (TGO) on silicon), doped semiconductor material (e.g., silicon germanium or silicon-boron-germanium), and other materials that can be made optically smooth enough to be reflective. In addition, the surfaces of the fingers 12 and 14 can be made more reflective with a suitable film, such as metal films of gold, silver, aluminum, etc. Suitable substrate materials for the device 10 if used as a reflection grating include quartz, glass or any other advantageous substrate to which a semiconductor layer could be bonded. If employed as a transmission grating, the opaque materials noted above for a reflection grating can be used to form the fingers 12 and 14, and without the limitation that the top surfaces of the fingers 12 and 14 are reflective. However, in order for radiation to pass completely through the device 10, the substrate 30 is required to have a hole (not shown) through its cavity 32, or be formed of a material sufficiently transparent to the wavelength(s) of interest, e.g., quartz or glass for visible light.

In a preferred embodiment, a wafer is processed by a known bondetchback process, by which the surface of the substrate 30 is etched to form the cavity 32, the surface (including the cavity 32) is then oxidized to form a bond oxide layer 44, and a semiconductor layer 23 epitaxially grown on a second wafer is bonded to the oxide layer 44 of the substrate 30. The second wafer is then selectively removed to leave only the epitaxial layer 23 bonded to the substrate 30 and overlying the cavity 32. The interdigitated fingers 12 and 14, their bases 16 and 18 and anchors 36 and 40, and the springs 34 can then be etched from the portion of the epitaxial layer 23 overlying the cavity 32, whereby trenches that are etched through the epitaxial layer 23 serve to form the gaps 22 and 24 and thereby delineate the fingers 12 and 14.

From the above, one skilled in the art will appreciate that the grating device 10 may be fabricated using processing steps the same as or similar to those used to form various electronic structures, such as the sensing devices disclosed in U.S. Pat. No. 5,450,751 to Putty et al., U.S. Pat. No. 5,547,093 to Sparks, U.S. Pat. No. 5,872,313 to Zarabadi et al., and U.S. patent application Ser. No. 09/410,712 to Rich all of which are assigned to the assignee of the present invention and incorporated herein by reference. Consequently, it is believed that a detailed discussion of a processing sequence to fabricate the device 10 is not required beyond that provided above.

It is foreseeable that various means could be employed to effect movement of the fingers 12 relative to the fingers 14, such as micro manipulators, micro actuators, micro gears and motors, and such techniques are within the scope of this invention. In a preferred embodiment of the invention, each of the gaps 22 defines a capacitive gap between the fingers 12 and 14 of each pair 20, and a voltage is selectively applied across the gaps 22 to draw the fingers 12 and 14 of a finger pair 20 together or to push the fingers 12 and 14 apart. For this purpose, the fingers 12 and 14 are processed to be smooth capacitor plates separated but capacitively coupled via the gaps 22. FIG. 1 shows one of the anchors 36 for the springs 34 and the anchor 40 of the base 18 having electrical contacts 38 and 42, respectively, for electrically biasing the fingers 12 and 14 relative to each other. The fingers 12 and 14 must be of an appropriate size, preferably relatively long, narrow, and moderately deep in order to function as capacitor plates capable of achieving a suitable degree of capacitive coupling. In addition, the fingers 12 and 14 are preferably of uniform size and large relative to the width of the capacitive gaps 22, each of which preferably has a uniform width that is initially on the order of about one micrometer. If the movable fingers 12 are caused to move toward their respective fixed fingers 14, the widths of the capacitive gaps 22 are reduced while the widths of the gaps 24 are simultaneously increased.

Figure 3:
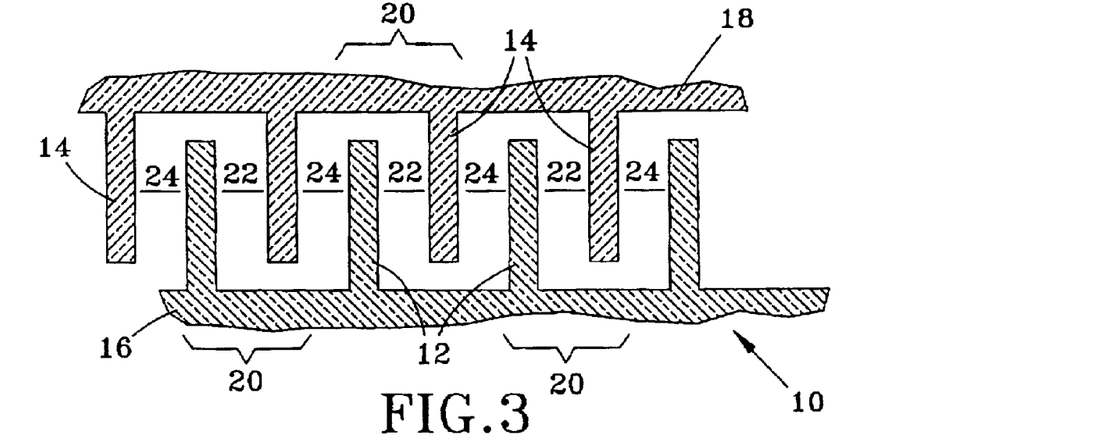
FIGS. 3 and 4 represent off and on-states of the diffraction grating device of FIGS. 1 and 2 when operated in a digital mode.
Figure 4:
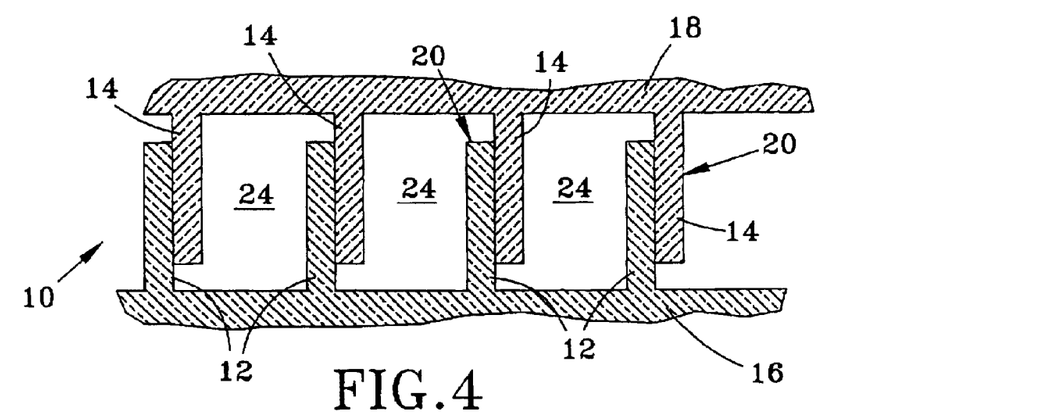

If the device 10 is configured so that relative movement of the interdigitated fingers 12 and 14 occurs as a result of capacitive coupling, the degree to which the fingers 12 and 14 are displaced, and therefore the widths of the gaps 22 between the fingers 12 and 14 of a pair 20 and the widths of the gaps 24 between finger pairs 20 is determined by the amount of voltage applied. For a fixed incident angle of light, the widths of the gaps 22 and 24 determine the wavelength of the light that is diffracted with the device 10 at some angle, conventionally denoted as an angle 2 between the diffracted light and a line perpendicular to the grating surface defined by the fingers 12 and 14. As such, the gaps 24 between the pairs 20 will be termed the diffraction gaps 24, though it is to be understood that the device 10 is capable of being operated as a reflection grating in which radiation is diffracted by reflection off the fingers 12 and 14, as well as a transmission grating in which radiation is diffracted by transmission through the gaps 24. Since the correlation between the applied voltage and the displacement of the movable fingers 12 relative to the fixed fingers 14 is known for any particular geometrical arrangement of parallel plate capacitors and given parameters for the springs 34, the widths of the gaps 24 can be readily controlled to allow for the precise diffraction of any desired color. FIG. 3 illustrates a first state in which the gaps 22 and 24 are approximately equal, while FIG. 4 illustrates a second state in which the finger pairs 20 nearly contact each other to substantially eliminate the gaps 22 therebetween while widths of the gaps 24 are maximized. In this manner, FIGS. 3 and 4 represent the device 10 as being digitally operated between an on-state and an off-state. Assuming that the offstate is illustrated in FIG. 3, corresponding to the lack of an applied voltage to the fingers 12 and 14, the fingers 12 and 14 are essentially at a null position. In this case, FIG. 4 represents the on-state in which an applied voltage has caused the fingers 12 to nearly move into contact with the fixed fingers 14. Alternatively, the fingers 12 and 14 could be normally in a state of near contact with each other (FIG. 4) by design, such that the off-state of FIG. 3 is the result of a voltage applied to push the fingers 12 and 14 apart.

As previously noted, when the device 10 is operated as a reflection grating, radiation incident on the device 10 is diffracted by reflection off the fingers 12 and 14. If operated as a transmission grating, radiation is diffracted by transmission through the gaps 24. In either case, the wavelength of the diffracted radiation can be calculated from Equation 1 below.

$$m(8)=d(\sin 2 - \sin N) \qquad \text{Eq. 1.}$$

where m is the order number, 8 is the wavelength of the diffracted light, d is the width of the gap 24 (the "grating period"), 2 is the angle of incident light to a line perpendicular to the grating surface, and N is the angle of diffracted light to a line perpendicular to the grating surface. For a source having a broad continuous spectrum, the zeroth-order image (m=0) corresponds to the white light image at 2=0. The first-order spectrum (m=!1) appears on either side of the zeroth-order image and is followed, along with alternate intervals of darkness, by the higher order spectra (m=!2, m=!3, etc.). With reference to the device 10 in the state represented in FIG. 3, assuming the order number for the diffracted light is 1, 2 is zero (the incident light is normal to the plane of the device 10), N is 11 degrees (the diffracted light is 11 degrees with respect to the normal to the plane of the device 10), the gaps 22 and 24 are initially about 0.7 micrometer (i.e., equal), and a finger 12/14 width of 1.0 micrometer, the primary wave length of light diffracted from the device 10 would be about 0.325 micrometers, which is in the near-ultraviolet range and therefore not visible to the human eye. Therefore, FIG. 3 may be said to be the off-state for the device 10. Assuming that voltage is not applied to the fingers 12 and 14 to obtain the off-state of FIG. 3, the application of an appropriate voltage to the fingers 12 and 14 can be used to capacitively attract the fingers 12 and 14 of each pair 20, resulting in the configuration shown in FIG. 4. The result is that the gaps 24 are now twice their original width, i.e., about 1.4 micrometers. For the same conditions as given above for the off-state, the wavelength of light diffracted from the grating device 10 is about 0.65 micrometers, coinciding with the wavelength for red light. Accordingly, the voltage applied to the fingers 12 and 14 changed the wavelength of the diffracted light from an invisible one to a desired color, corresponding to an on-state for the grating device 10.

Those skilled in the art will appreciate that the grating device 10 could be operated in a reverse manner, whereby FIG. 4 corresponds to an off-state in which the gaps 24 are too large to diffract light in the visible range, while FIG. 3 would correspond to the on-state mode as a result of the gaps 24 being made sufficiently narrow to diffract a desired color. Additionally, the device 10 could be fabricated such that the on-state of FIG. 4 does not require an applied voltage, while the off-state of FIG. 3 requires the application of a voltage to repel the fingers 12 and 14 of each pair 20 apart. In any event, the on-state of the device 10 described above requires very little power, because its electrical operation is that of a capacitor. As such, the load on the power source for the device 10 is minimal, which is an important factor in many applications, such as HUD's for automobiles.

Figure 5:
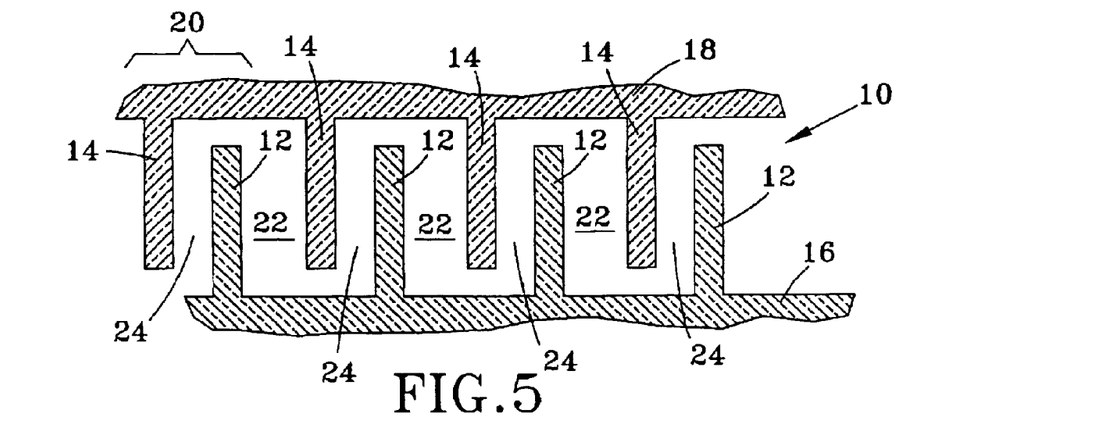
FIG. 5 represents an intermediate state of the diffraction grating device of FIGS. 1 and 2 when operated in an analog mode.

The operation of the device 10 in FIGS. 3 and 4 can be viewed as digital, in that the operation of the device 10 is either on or off. Extending the operation of the grating device 10 to perform as a variable frequency grating device is not conceptually difficult. Because the magnitude of the applied voltage determines the distance which the movable fingers 12 are displaced relative to the fixed fingers 14, and the wavelength of the diffracted light for a given incident angle is proportional to the width of the gaps 24, the wavelength of the diffracted light is proportional to a function of the applied voltage. Therefore, the voltage applied to the fingers 12 and 14 can be used to directly control the wavelength (and, therefore, color) of the light diffracted by controlling the spacing between the fingers 12 and 14, as represented in FIG. 5. Both analog and digital voltage inputs to the grating device 10 could be used for this purpose.

It should be noted that the diffraction grating device 10 of FIGS. 3 through 5 has three parameters that characterize its operation: the grating spacing (or ruling), dispersion and resolution, which are known terms of the art. The ruling of a diffraction grating is the period of lines and spaces of the grating, and is therefore determined by the widths of the gaps 22 and 24 and fingers 12 and 14. The dispersion of a diffraction grating can be defined as the ability of the grating to separate as widely as possible wavelengths that are close together. Finally, resolution (or the resolving power) of a grating can be viewed as the smallest angular (or linear) separation of two wavelengths for which they can be differentiated. For a known light source incident on the device 10 at a predetermined incident angle, the widths of the gaps 24 will determine the wavelength, and thus the color, of the diffracted light as shown with Equation 1 above. It is to achieve high dispersion that grating rulings are closely spaced, while high resolution is achieved with the device 10 by including a large number of rulings. Finally, the rulings on the grating (fingers) must be of an appropriate length. These factors—grating spacing, dispersion, resolution, and finger length—determine the size of the grating needed for a particular application, and thus dictate the absolute minimum individual pixel size. The packing density of the pixels is important, and is determined by the minimum pixel size and the addressing scheme, among other things. While many addressing schemes are known to those skilled in the art, density improvements beyond those directly provided by the device 10 on the top side of the substrate 30 may be realized if one of the finger contacts 38 or 42 is located on the backside of the substrate 30. In this manner, the bias applied between the two sets of fingers 12 and 14 can be provided by addressing one set of fingers via a topside runner, and the other set via a backside runner. In doing so, the total number of topside runners required for an array of the devices 10 is reduced and pixel density can be significantly increased.

With the device 10 of FIGS. 1 and 2 operating as shown in FIGS. 3 through 5, it can be seen that the use of only two sets of fingers 12 and 14 can result in two gaps 22 and 24 of different widths (FIG. 5) if the applied voltage is less than what is required to cause the full deflection of the moveable fingers 12 with respect to the fixed fingers 14. The result is the simultaneous diffraction of two different wavelengths of light for a given incident angle, which could lead to a mixing of colors if both gaps 22 and 24 diffract light in the visible spectrum. Color mixing may or may not be desired. If undesirable, color mixing can be avoided by sizing the gaps 22 and 24 so that one of the simultaneously diffracted wavelengths is outside the visible spectrum.

Figure 6:
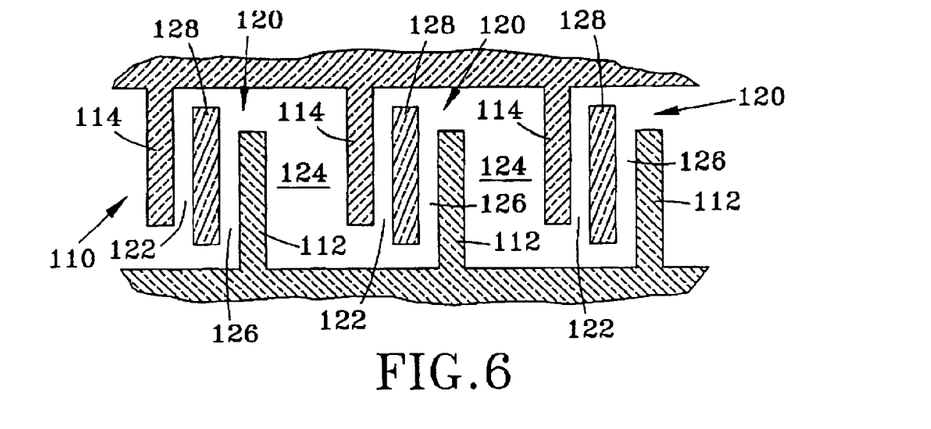
FIGS. 6 and 7 represent off and on-states of a diffraction grating device operated in a two-terminal mode in accordance with a second embodiment of this invention.
Figure 7:
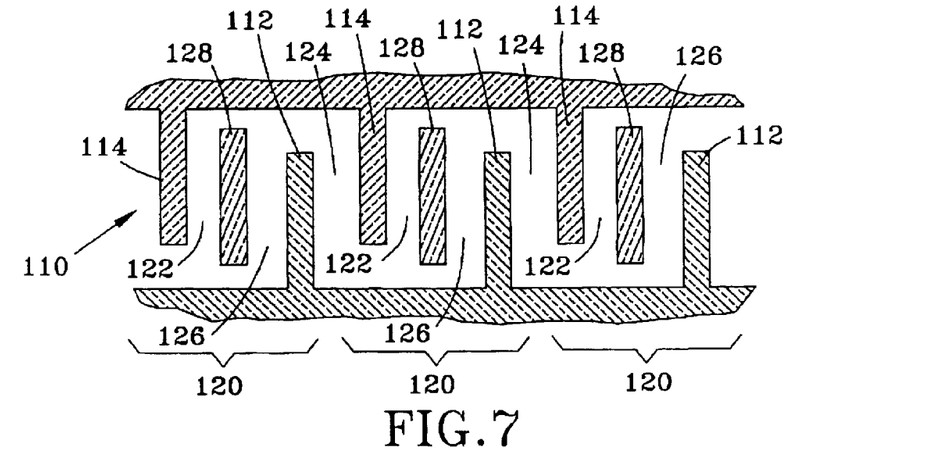
Figure 8:
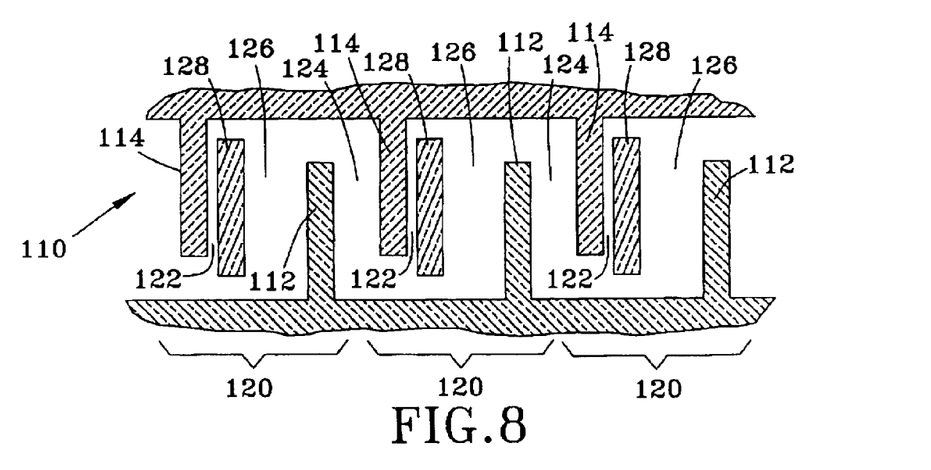
FIG. 8 represents the diffraction grating device of FIGS. 6 and 7 operated in a three-terminal mode.

In FIGS. 6, 7 and 8, a diffraction grating device 110 in accordance with a second embodiment of the invention is shown as having a third set of fingers 128. The device 110 can be operated in a two-terminal (FIGS. 6 and 7) or three-terminal (FIG. 8) mode. In FIGS. 6 and 7, the fingers 128 are said to electrically "float" because they are not actively addressed by the voltage applied to the fingers 112 and 114. In FIG. 8, the fingers 128 are actively addressed by an applied voltage to serve as a common terminal for the fingers 112 and 114. While the fingers 14 in FIGS. 3 through 5 are preferably fixed, both sets of fingers 112 and 114 can be movable in the embodiments of FIGS. 6 through 8.

FIGS. 6 and 7 depict both sets of fingers 112 and 114 as being movable and electrically addressed by the applied voltage, while the third set of fingers 128 is fixed. As with the embodiment of FIGS. 3 through 5, the fingers 112 and 114 are provided in electrode pairs 120 as a result of each finger 112 and 114 of each pair 120 comprising a capacitor plate. Because of the presence of the fingers 128, the fingers 112 and 114 of each electrode pair 120 are separated by two gaps 122 and 126, while adjacent electrode pairs 120 are separated by a third gap 124. When a voltage is applied to the fingers 112 and 114, the fingers 112 and 114 are either drawn together or repelled apart, depending on the polarity of the applied charge. As with the previous embodiments, the widths of the gaps 122, 124 and 126 can be varied to change the color of the light that is diffracted with the device 110. As an example, in FIG. 7 the widths of the gaps 122, 124 and 126 may be sufficiently small so that the diffracted light is outside the visible spectrum. Assuming that the fingers 112 and 114 are pushed apart by an applied voltage, FIG. 6 shows the widths of the gaps 122 and 126 as having been decreased while the widths of the gaps 124 have been sufficiently increased to diffract light of a visible wavelength. Because the remaining two gaps 122 and 126 are narrower in FIG. 6 than in FIG. 7, the wavelengths of the light diffracted through the gaps 122 and 126 in FIG. 6 is farther outside the visible spectrum than in FIG. 7, such that these gaps 122 and 126 do not cause a mixing of visible light colors. A second electrical configuration for the device 110 might have the movable fingers 112 and 114 at the same potential, and have the fixed fingers 128 at a different potential by appropriately contacting the fixed fingers 128, and having them function as one plate of a capacitor, while both sets of fingers 112 and 114 are functionally the other plate of the capacitor.

While the above discussion is primarily directed to controlling the widths of the gaps 122, 124 and 126, control could also be viewed as relating the variable grating properties of the device 110 to the effective size of the "blocks" of fingers 112, 114 and 128. The device 110 can be configured so that the gaps 122 and 126 between the fingers 112, 114 and 128 within a block are at all times so narrow such that the wavelengths diffracted with the gaps 122 and 126 are very short and therefore never visible. In this case, a set of blocks is effectively one grating ruling. For example, the gaps 122 and 126 separating the fingers 112, 114 and 128 in FIG. 6 may be on the order of only ten percent of the spacing required for the desired color. If the gaps 122 and 126 between the fingers 112, 114 and 128 within a block are sufficiently small, each block of three fingers 112, 114 and 128 may be considered to optically function as a single ruling. As before, the initial state (no applied voltage) of the device 110 (e.g., FIG. 6) can be made to minimize the power usage of the device 110, the off-state (e.g., FIG. 7) can be in a wavelength longer or shorter than those in the visible range, and the sizes and shapes of the fingers 112, 114 and 126 may be varied for both electrical and optical performance improvements.

The grating device 110 is operated in FIG. 8 to utilize the floating fingers 128 as a third terminal to the first and second fingers 112 and 114. The resulting three-terminal device 110 allows for separate tuning of the fingers 112 and 114 relative to the stationary fingers 128. In this manner, asymmetric gaps may be simultaneously formed such that at least two ruling spacings are present, enabling further control of the color output of the device 110 as well as selective mixing of colors if so desired. If FIG. 8 represents the device 110 in the off-state, applying a voltage to the fingers 112 and 128 to cause the movable fingers 112 to move into contact with the stationary fingers 128 decreases the "interfinger" gap 126 while increasing the "interblock" gap 124 sufficiently to diffract visible light, e.g., a gap width of about 0.65 micrometers to diffract red light. To reduce the width of the gap 124 for the purpose of changing the color of the diffracted light, the voltage could be reduced between the fingers 112 and 128. Alternatively, a voltage of the same polarity could be applied between the fingers 114 and 128, causing the movable fingers 114 to be repelled away from the stationary fingers 128 with the same result as before. The interblock gap 124 is reduced as a result of the movable fingers 114 moving toward the adjacent block of fingers.

Figure 9:
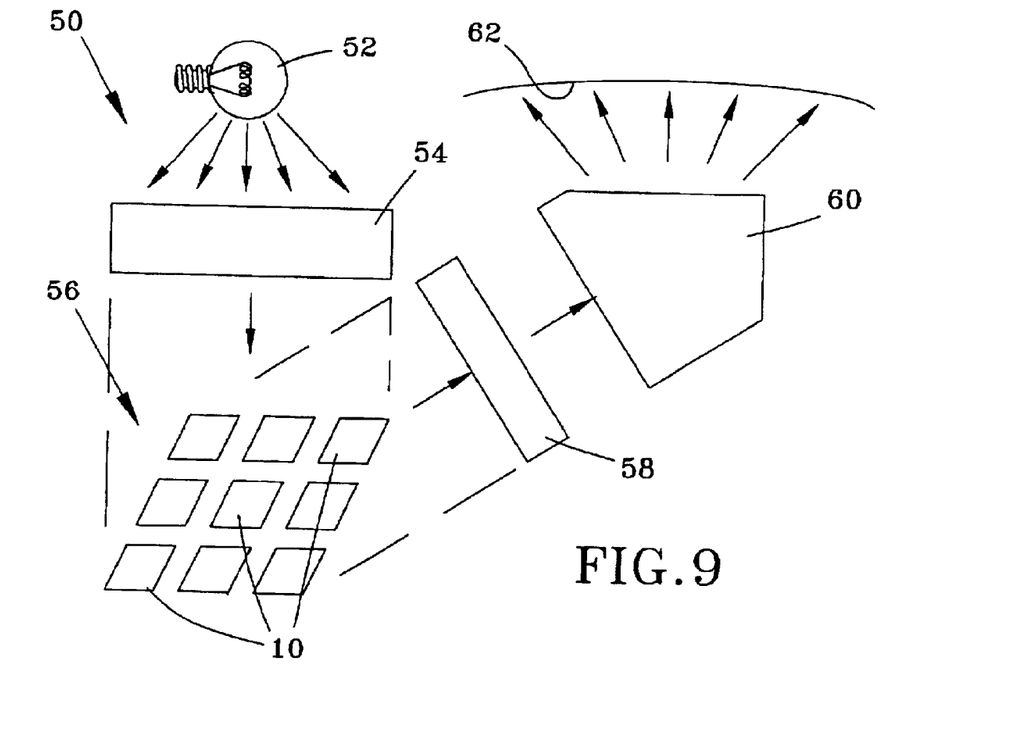
FIG. 9 schematically represents a reconfigurable head-up display utilizing a two-dimensional array of diffraction grating devices of this invention.

A two-dimensional reconfigurable image source 50 that makes use of multiple grating devices 10 according to FIGS. 1 through 5 is represented in FIG. 9 for illustrative purposes. A suitable radiation source, such as a white light source 52, is shown as emitting radiation that is collimated with appropriate collimating optics 54. The collimated beams are projected onto an array 56 of the grating devices 10, each of which defines a single pixel of the image source 50. The collimated beams are indicated as being incident on the devices 10 at an angle normal to the plane of the devices 10, producing a diffracted beam reflected by the fingers 12 and 14 toward imaging optics 58. The imaging optics 58 are preferably employed to magnify the image and correct for any aberrations so that the magnified image is in focus for its intended use. The diffracted radiation is then directed toward projection optics 60 that finally display an image on a surface 62, such as on a screen, windshield or canopy. The image may also be displayed directly to an observer.

One can appreciate from FIG. 9 that density improvements beyond those directly provided by the device 10 (as well as the device 110) may be realized if a backside contact is made to one of the sets of fingers 12 and 14, to reduce runner complexity on the topside while also increasing pixel density, as previously discussed. The contrast of the diffracted image may be increased by depositing various material that tend to absorb light in the dark spaces on and between pixels. For example, silicon nitride or a known anti-reflective coating (ARC) could be used for this purpose. Alternatively, the surfaces of such dark spaces could be textured to have the desired effect. An example of a surface texturing method involves the formation of "black silicon" using the same type of equipment that could be used to etch the fingers.

Figure 10:
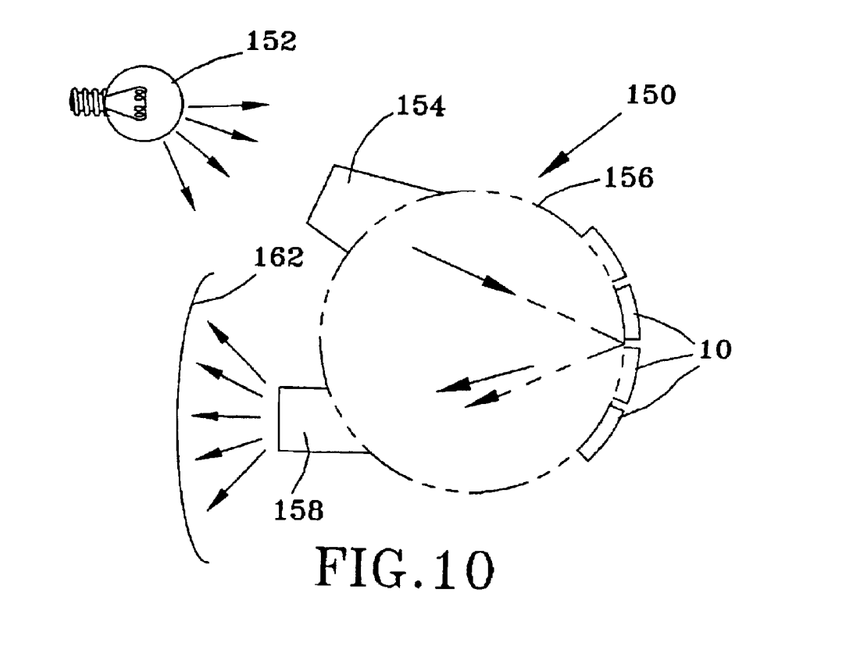
FIG. 10 schematically represents a three-dimensional reconfigurable image source utilizing multiple diffraction grating devices of this invention.

A three-dimensional reconfigurable image source 150 is represented in cross-section in FIG. 10, and shows diffraction grating devices 10 of this invention arranged on the arc of a relatively large radius circle (e.g., a Roland circle or a Paschen mount). As with the embodiment shown in FIG. 9, a suitable radiation source, such as a white light source 152, is shown emitting radiation that is collimated with collimating optics 154, projected onto an array 156 of the grating devices 10 to produce a diffracted beam that is reflected toward imaging/projection optics 158, and finally displayed as an image 162. Because the grating array 156 is concave, it assumes focusing properties as well as the ability to diffract. As such, the need for collimating or focusing lenses can be reduced or eliminated.

From the above, it can be appreciated that the grating devices 10 and 110 of this invention generally rely on laterally moving elements (as opposed to elements that move in a direction perpendicular to the plane of the elements) that can be actuated by various means. In the devices 10 and 110, the moving elements are the fingers 12, 14, 112, 114 and 128 and the actuation means is through the electrical attraction or repulsion of the fingers. Grating devices with configurations that differ from that shown in the Figures are also encompassed by the present invention. Furthermore, the grating devices may be used with monochromatic light sources, lasers, or one or more beams of polarized light. The devices 10 and 110 can be formed on or used in combination with reflective and transparent substrates, such that either reflected or transmitted light can be diffracted by the same grating device 10 or 110.

In addition to the above, the fingers 12, 14, 112, 114 and 128 can be fabricated to have any suitable three-dimensional geometry in order to obtain a particular electrical or mechanical advantage, and may have any suitable width and shape to realize an optical advantage. Furthermore, the fingers 12, 14, 112, 114 and 128 are not required to have identical shapes or sizes. For example, it may be preferred that the stationary fingers 128 have a different width than the movable fingers 112 and 114. The upper surfaces of the fingers 12, 14, 112, 114 and 126 may also be provided with a shape advantageous for a particular effect. For example, with a proper angle etched into the upper surfaces of the fingers 12, 14, 112, 114 and 128 along their lengths, a blazed grating may be formed that can recover a portion of the light energy lost to zeroth-order diffraction.

Figure 11:
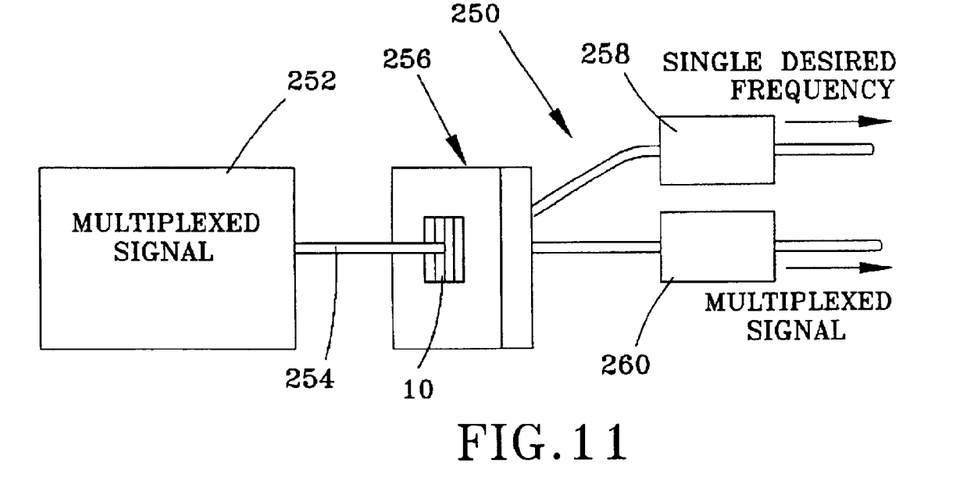
FIGS. 11 and 12 schematically represent two additional applications that utilize multiple diffraction grating devices of this invention.

The operational requirements of a reconfigurable image source that employs the devices 10 and 110 of this invention will be appreciated by those skilled in the art, and therefore have not been discussed in any detail here. It is sufficient to say that the performance of an image source can be enhanced through the use of the devices 10 and 110 as pixels, each generating a desired color as a result of the devices 10 and 110 being capable of being individually electrically addressed. Furthermore, various configurations and applications for the devices 10 and 110 are foreseeable, depending on the intended application and operating natural mode of the device. For example, the variable grating devices 10 and 110 could be used to pull signals off of an optical fiber at specific frequencies. One such application represented in FIG. 11 is a wavelength separation device 250, such as in dense wavelength division multiplexing (DWDM) technology, in which large amounts of data (bandwidth) is transmitted as a multiplexed signal 252 via a single optical fiber 254 through a grating device 10 operating as a transmission grating unit 256. By changing the grating spacing, radiation can be diffracted at any frequency to a sensor 258 (or multiple sensors), thereby accurately selecting a signal (or multiple signals) out of many multiplexed signals. In this manner, the device 10 is able to operate as a frequency switch along the optical path, while the remaining multiplexed signals continue through the fiber 254, such as to a signal amplifier 260 for any further purpose.

Figure 12:
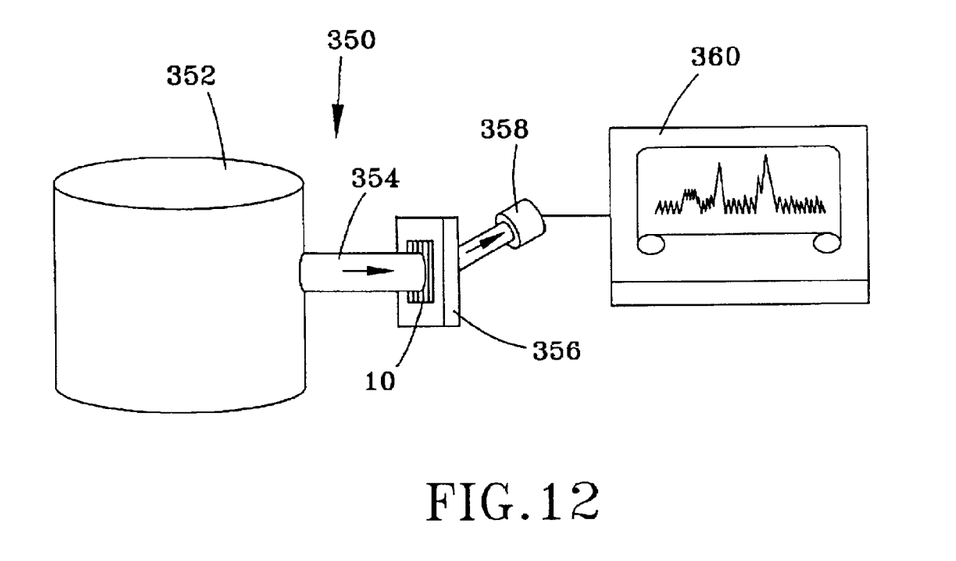

Yet another application for the invention is a chromatograph, such as a plasma-phase chromatography unit 350 represented in FIG. 12 as a type used to identify the substances in a plasma. This technique is based on the knowledge that plasmas of different elements or compounds have a characteristic wavelength (or set of wavelengths) associated with them when they recombine. FIG. 12 represents a plasma chamber 352 containing plasma of an unknown gas or mixture, and a passage 354 from the chamber 352 to a transmission grating unit 356 containing a variable grating device 10 of this invention. Given a fixed angle of light from plasma incident on the grating device 10 and a light sensor 358 with a fixed position relative to the device 10, substances in the plasma can be identified by the characteristic wavelengths of the light diffracted as the variable diffraction grating 10 scans through the available range of element spacings. The resulting electrical signal can then be appropriately conditioned and outputted to a chart recorder 360, or any suitable means for data recovery such as a computer.

While the invention has been described in terms of specific embodiments, other forms could be adopted by one skilled in the art. Accordingly, the scope of the invention is to be limited only by the following claims.

What is claimed is:

1. A diffraction grating device comprising:
   first and second sets of elements, the first set of elements extending toward and being interdigitated with the second set of elements so that each element of the first set of elements defines an element pair with an immediately adjacent element of the second set of elements, and so that a first gap is defined between the elements of each element pair and a second gap is defined between each adjacent pair of clement pairs;
   means for moving the elements of the element pairs toward and away from each other to decrease and increase, respectively, the first gaps and to increase and decrease, respectively, the second gaps; and
   means for projecting radiation toward the elements to produce diffracted radiation of at least one wavelength.

2. The diffraction grating device according to claim 1, wherein the diffraction grating device is a transmission grating and the projected radiation passes through the first and second gaps to produce the diffracted radiation.

3. The diffraction grating device according to claim 1, wherein the diffraction grating device is a reflection grating and the projected radiation is reflected by the elements to produce the diffracted radiation.

4. The diffraction grating device according to claim 1, wherein the elements of the first and second sets of elements are substantially parallel to each other.

5. The diffraction grating device according to claim 1, wherein the elements of each element pair comprise capacitive plates and the moving means applies a voltage across the capacitive plates to cause the elements of each element pair to move toward or away from each other.

6. The diffraction grating device according to claim 1, wherein the projected radiation has a first wavelength range that encompasses the visible light spectrum, and the diffracted radiation includes a first wavelength within the visible light spectrum and a second wavelength outside the visible light spectrum.

7. The diffraction grating device according to claim 1, further comprising a third set of elements, the elements of the third set being between the elements of the element pairs so that the gap defined between the elements of each element pair is subdivided into two smaller gaps separated by one of the elements of the third set of elements.

8. The diffraction grating device according to claim 7, wherein the elements of the third set of elements do not move under the influence of the moving means.

9. The diffraction grating device according to claim 7, wherein the moving means causes the elements of the first and second sets to independently move toward and away from the elements of the third set to decrease and increase, respectively, the smaller gaps therebetween.

10. The diffraction grating device according to claim 1, wherein the diffraction grating device is one of a plurality of diffraction grating devices arranged in a planar array.

11. The diffraction grating device according to claim 1, wherein the diffraction grating device is one of a plurality of diffraction grating devices arranged in an arcuate array.

12. The diffraction grating device according to claim 1, wherein the projected radiation is selected from the group consisting of spectral, monochromatic, and polarized light.

13. The diffraction grating device according to claim 1, wherein the moving means operates digitally so that the elements of the clement pairs have two steady-state positions relative to each other, wherein the first gaps between the elements of the element pairs are at a maximum width in a first of the steady-state positions, and the elements of the element pairs nearly contact each other to substantially eliminate the first gaps therebetween in a second of the steady-state positions.

14. The diffraction grating device according to claim 1, wherein the moving means has an analog operation so that the elements of the element pairs have more than two steady-state positions, in which the elements of the element pairs are movable between a first steady-state position at which the first gaps therebetween have a maximum width and a second steady-state position at which the first gaps have a minimum width.

15. The diffraction grating device according to claim 1, wherein the diffraction grating device is one of a plurality of diffraction grating devices that define pixels of a reconfigurable color image source.

16. The diffraction grating device according to claim 1, wherein the diffraction grating device is a frequency switch of an optical fiber.

17. The diffraction grating device according to claim 1, wherein the diffraction grating device is a component of a chromatograph.

18. The diffraction grating device according to claim 1, wherein each of the elements has an angled surface for recovering a portion of light energy lost to zeroth-order diffraction.

19. A variable diffraction grating device of a reconfigurable color image source, the variable diffraction grating device comprising:
   a first set of elements extending toward and being parallel and interdigitated with a second set of elements, each element of the first set of elements defining an element pair with an immediately adjacent element of the second set of elements, a first gap being defined between the elements of each clement pair, a second gap being defined between each adjacent pair of element pairs, the elements of each element pair comprising capacitive plates;
   means for charging the capacitive plates so as to move the elements of the element pairs toward and away from each other to decrease and increase, respectively, the first gaps and to increase and decrease, respectively, the second gaps; and
   means for projecting radiation at an angle relative to the first and second sets of elements, so that radiation is diffracted at two different wavelengths by reflection off of the first and second sets of elements, the second gaps being sized so that at least one of the two different wavelengths is in the visible light spectrum.

20. The variable diffraction grating device according to claim 19, wherein the first gaps are sized so that a second of the two different wavelengths is outside the visible light spectrum.

21. The variable diffraction grating device according to claim 19, further comprising a third set of elements, the elements of the third set being between the elements of the element pairs so that the first gap defined between the elements of each element pair is subdivided into two smaller gaps separated by one of the elements of the third set of elements.

22. The variable diffraction grating device according to claim 21, wherein the elements of the third set of elements do not move under the influence of the moving means.

23. The variable diffraction grating device according to claim 21, wherein the moving means causes the elements of the first and second sets to independently move toward and away from the elements of the third set to decrease and increase, respectively, the smaller gaps therebetween.

24. The variable diffraction grating device according to claim 19, wherein the diffraction grating device is one of a plurality of diffraction grating devices arranged in a planar array.

25. The variable diffraction grating device according to claim 19, wherein the diffraction grating device is one of a plurality of diffraction grating devices arranged in an arcuate array.

26. The variable diffraction grating device according to claim 19, wherein the moving means operates digitally so that the elements of the element pairs have two steady-state positions relative to each other, wherein the first gaps between the elements of the element pairs are at a maximum width in a first of the steady-state positions, and the elements of the element pairs nearly contact each other to substantially eliminate the first gap therebetween in a second of the steady-state positions.

27. The variable diffraction grating device according to claim 19, wherein the moving means has an analog operation so that the elements of the element pairs have more than two steady-state positions, in which the elements of the element pairs are movable between a first steady-state position at which the first gaps therebetween have a maximum width and a second steady-state position at which the first gaps therebetween have a minimum width.

28. A method of diffracting radiation, the method comprising the steps of:
providing a diffraction grating device comprising first and second sets of elements, the first set of elements extending toward and being interdigitated with the second set of elements so that each element of the first set of elements defines an element pair with an immediately adjacent element of the second set of elements, and so that a first gap is defined between the elements of each element pair and a second gap is defined between each adjacent pair of element pairs;
moving the elements of the element pairs toward and away from each other to increase and decrease, respectively, the second gaps therebetween; and
projecting radiation toward the elements to produce diffracted radiation of at least one wavelength.

29. The method according to claim 28, wherein the diffraction grating device is a transmission grating and the projected radiation passes through the first and second gaps to produce the diffracted radiation.

30. The method according to claim 28, wherein the diffraction grating device is a reflection grating and the projected radiation is reflected by the elements to produce the diffracted radiation.

31. The method according to claim 29, wherein the elements of each element pair comprise capacitive plates and the moving step comprises applying a voltage across the capacitive plates to cause the elements of each element pair to move toward and away from each other.

32. The method according to claim 28, wherein the projected radiation has a first wavelength range that encompasses the visible light spectrum, and the diffracted radiation includes a first wavelength within the visible light spectrum and a second wavelength outside the visible light spectrum.

33. The method according to claim 28, wherein the providing step comprises providing a third set of elements that are between the elements of the clement pairs so that the first gap defined between the elements of each element pair is subdivided into two smaller gaps separated by one of the elements of the third set of elements.

34. The method according to claim 33, wherein the elements of the third set of elements do not move during the moving step.

35. The method according to claim 33, wherein the elements of the first and second sets independently move toward and away from the elements of the third set during the moving step.

36. The method according to claim 28, further comprising the step of arranging a plurality of the diffraction grating devices in a planar array.

37. The method according to claim 28, further comprising the step of arranging a plurality of the diffraction grating devices in an arcuate array.

38. The method according to claim 28, wherein the projected radiation is selected from the group consisting of spectral, monochromatic, and polarized light.

39. The method according to claim 28, wherein the moving step comprises digitally operating the elements of the element pairs to have two steady-state positions relative to each other, wherein the first gaps are at a maximum width in a first of the steady-state positions, and the elements of the element pairs nearly contact each other to substantially eliminate the first gaps therebetween in a second of the steady-state positions.

40. The method according to claim 28, wherein the moving step comprises analogously operating the elements of the element pairs to have more than two steady-state positions, in which the elements of the element pairs are movable between a first steady-state position at which the first gaps therebetween have a maximum width and a second steady-state position at which the first gaps therebetween have a minimum width.

41. The method according to claim 28, wherein the diffraction grating device is arranged with a plurality of identical variable diffraction grating devices, the method further comprising the step of operating the variable diffraction grating devices as a reconfigurable color image source.

42. The method according to claim 28, wherein the diffraction grating device is operated as a frequency switch of an optical fiber carrying multiplexed signals.

43. The method according to claim 28, wherein the diffraction grating device is operated as a component of a chromatograph to identify substances in a plasma.

44. The method according to claim 28, wherein each of the elements has an angled surface so as to recover a portion of light energy lost to zeroth-order diffraction.

45. A method of manufacturing a diffraction grating device, the method comprising the step of etching a layer overlying a cavity in a surface of a substrate so that portions of the layer are removed to delineate first and second anchors attached to the substrate and so that trenches are formed through the layer to delineate first and second sets of elements interconnected with the first and second anchors, respectively, so as to be suspended over the cavity and to delineate at least one spring that connects at least one of the first and second sets of elements to its respective first or second anchor to enable relative movement between the first and second sets of elements, the first set of elements extending toward and being interdigitated with the second set of elements so that each element of the first set of elements defines an element pair with an immediately adjacent element of the second set of elements, and so that a first gap is defined between the elements of each element pair and a second gap is defined between each adjacent pair of element pairs, the elements of the element pairs being movable relative to each other in directions toward and away from each other to decrease and increase, respectively, the first gaps and to increase and decrease, respectively, the second gaps.

46. The method according to claim 45, further comprising the step of forming means for moving the elements of the element pairs toward and away from each other to decrease and increase, respectively, the first gaps and to increase and decrease, respectively, the second gaps.

47. The method according to claim 45, wherein the elements of the first and second sets of elements are formed so as to be substantially parallel to each other.

48. The method according to claim 45, wherein the elements of each element pair are formed to be capacitive plates.

49. The method according to claim 45, further comprising the step of forming a third set of elements, the elements of the third set being between the elements of the element pairs so that the gap defined between the elements of each element pair is subdivided into two smaller gaps separated by one of the elements of the third set of elements.

50. The method according to claim 49, wherein the elements of the third set of elements are formed so as not to move under the influence of the moving means.

51. The method according to claim 49, wherein the elements of the first and second sets are independently movable toward and away from the elements of the third set to decrease and increase, respectively, the smaller gaps therebetween.

52. The method according to claim 45, wherein the diffraction grating device is formed as one of a plurality of diffraction grating devices that define pixels of a reconfigurable color image source.

53. The method according to claim 45, further comprising the step of etching each of the elements to have an angled surface for recovering a portion of light energy lost to zeroth-order diffraction.

* * * * *